(12) United States Patent
Fincato

(10) Patent No.: US 11,543,730 B1
(45) Date of Patent: Jan. 3, 2023

(54) PHASE SHIFTER ARCHITECTURE FOR OPTICAL BEAM STEERING DEVICES

(71) Applicant: STMicroelectronics S.r.l., Agrate Brianza (IT)

(72) Inventor: Antonio Fincato, Novara (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/471,757

(22) Filed: Sep. 10, 2021

(51) Int. Cl.
    *G02F 1/295* (2006.01)

(52) U.S. Cl.
    CPC .................................. *G02F 1/2955* (2013.01)

(58) Field of Classification Search
    CPC .............. G02F 1/2955; G02B 6/12009; G02B 6/29301; G02B 27/0087
    See application file for complete search history.

(56) References Cited

U.S. PATENT DOCUMENTS

| | | | |
|---|---|---|---|
| 9,740,079 B1 | 8/2017 | Davids et al. | |
| 10,261,389 B2 | 4/2019 | Skirlo et al. | |
| 10,527,906 B2 | 1/2020 | Poulton et al. | |
| 10,656,496 B2 | 5/2020 | Hashemi et al. | |
| 11,320,717 B2* | 5/2022 | Zhu | G01S 17/89 |
| 11,404,781 B2* | 8/2022 | Fitzgerald | H01Q 21/0006 |
| 2017/0131615 A1 | 5/2017 | Park et al. | |
| 2020/0264490 A1 | 8/2020 | Zhu et al. | |

OTHER PUBLICATIONS

Martijn J.R. Heck, "Highly integrated optical phased arrays: photonic integrated circuits for optical beam shaping and beam steering," Nanophotonics, Feb. 2, 2016, pp. 16.

* cited by examiner

*Primary Examiner* — John Bedtelyon
(74) *Attorney, Agent, or Firm* — Slater Matsil, LLP

(57) ABSTRACT

An optical beam steering device and a method for beam steering are described. The optical beam steering device including: a laser source coupled to an optical phased array (OPA) The OPA includes: a beam splitter network optically coupled to the laser source and configured to split a laser beam generated by the laser source into N outputs to generate an output optical beam; a first network of first phase shifters configured to steer the output optical beam in a first direction away from a longitude direction; and a second network of second phase shifters configured to steer the output optical beam in a second direction away from the longitude direction, the second direction being opposite to the first direction.

24 Claims, 10 Drawing Sheets

PHASE SHIFTER ARCHITECTURE FOR OPTICAL BEAM STEERING DEVICES

TECHNICAL FIELD

The present invention relates generally to optical beam steering, and, in particular embodiments, to phase shifter architecture for optical beam steering devices.

BACKGROUND

The use of devices utilizing free-space laser beams have been proven for numerous applications in three-dimensional mapping and imaging, such as geological surveying, and control and navigation for autonomous vehicles. Light detection and ranging (LiDAR) has emerged as a technology for determining a variable distance of an object by transmitting a beam towards an object and measuring the time for light reflected off the object to return. In this context, the light beam has to be transmitted towards the object. To be able to map a target area around the sensor, the sensor's beam has to be oriented or steered in different directions.

Of course, mechanically moving the sensor is one way to achieve beam steering. One way to steer the beam of a LiDAR sensor without mechanical movement of the sensor is an Optical Phased Array (OPA). OPAs provide a more flexible and efficient beam steering device.

OPAs are designed to generate beams with different phase shifts so as to create patterns of constructive and destructive interference forming an output beam. However, conventional OPAs are not scalable and complex in both the architecture as well as electrical control when a large number of outputs are to be realized.

SUMMARY

In accordance with an embodiment of the present invention, a beam steering device includes: a laser source coupled to an optical phased array (OPA), the OPA including: a beam splitter network optically coupled to the laser source and configured to split a laser beam generated by the laser source into N outputs to generate an output optical beam; a first network of first phase shifters configured to steer the output optical beam in a first direction away from a longitude direction; and a second network of second phase shifters configured to steer the output optical beam in a second direction away from the longitude direction, the second direction being opposite to the first direction.

In accordance with an embodiment of the present invention, a beam steering device includes: a switching matrix including a plurality of z outputs coupled to a plurality of optical phased arrays (OPAs) and configured to guide a laser beam emitted by a laser source sequentially to the plurality of OPAs, the laser being emitted around a main axis, each of the plurality of OPAs including an output optical beam direction oriented around a central beam axis, the central beam axis of each of the plurality of OPAs being different from one another, each of the plurality of OPAs including: a beam splitter network coupled to the laser source configured to split the laser beam into N outputs to generate a corresponding output optical beam, a first network of first phase shifters configured to steer the output optical beam in a first direction away from the central beam axis, and a second network of second phase shifters configured to steer the output optical beam in a second direction away from the central beam axis, the second direction being opposite to the first direction.

In accordance with an embodiment of the present invention, a method for beam steering includes: coupling a laser source to a first optical phased array (OPA), the first OPA including a beam splitter network having an output including a plurality of N outputs around a first central beam axis, a first network of first phase shifters, and a second network of second phase shifters; generating an output optical beam around the first central beam axis at the output of the beam splitter network by steering the output optical beam in a first direction away from the first central beam axis with a first network of first phase shifters; and steering the output optical beam in a second direction away from the first central beam axis with a second network of second phase shifters, the second direction being opposite to the first direction.

BRIEF DESCRIPTION OF THE DRAWINGS

For a more complete understanding of the present invention, and the advantages thereof, reference is now made to the following descriptions taken in conjunction with the accompanying drawings, in which:

FIG. 2A illustrates a schematic diagram of the optical phased array when it is configured to steer an output optical beam in a first direction, FIG. 2B illustrates a schematic diagram of the optical phased array when it is configured to steer the output optical beam in a second direction opposite the first direction, and FIG. 2C illustrates a side view of the beam steering device;

FIG. 3A illustrates a schematic diagram of an optical phased configured to have a central beam axis disposed at an offset angle in a first direction, and FIG. 3B illustrates a schematic diagram of an optical phased configured to have a central beam axis disposed at an offset angle in a second direction;

FIG. 5A illustrates a beam steering device with an even number of optical phased arrays (OPAs), and FIG. 5B illustrates a beam steering device with an odd number of optical phased arrays (OPAs)

DETAILED DESCRIPTION OF ILLUSTRATIVE EMBODIMENTS

OPAs operate by transmitting a plurality of beams through an array antenna that superimpose (i.e., combine) in the far-field to form an output beam. Each of the plurality of beams undergoes a different phase shift so each of the transmitted beams is emitted at different times. This may result in the output optical beam being transmitted at an angle, known as the beam steering angle. The coverage of the beam steering device may be defined by the range of the beam steering angle.

OPAs typically comprise three elements: a beam splitting network configured to split the input of the OPA into a plurality of channels, a network of phase shifters to generate the phase difference between antenna elements, and the antenna elements.

Typically, OPAs utilize a phase shifter on each of the channels, except one, to cause an equal phase difference (e.g. a different phase shift) between adjacent channels. However, to generate a different phase shift between adjacent channels, a different voltage signal must be applied to each of the individual phase shifters. This may require each of the phase shifters to be controlled by individual and connected electronic circuits.

While optical phased arrays (OPAs) allow for non-mechanical beam steering of a LiDAR sensor, limitations still exist. As the quantity of channels increases, the number of individual and connected electronic circuits required to control the phase shift increases. Problematically, this results in an increase in power consumption and makes controlling the phase shift of each of the channels very difficult or even impossible.

Embodiments of this application disclose an optical transmitter such as an optical beam steering device that can steer an output beam with an improved coverage without an increase in the difficulty of controlling the phase shift of the channels. More specifically, embodiments of the present invention relate to a beam steering device with an increased beam steering angle range and without requiring additional circuitry as the quantity of channels in the OPA increases.

An embodiment optical transmitter will be described in FIG. 1. Embodiments of an optical phased array will be described using FIGS. 2A-2B and 3A-3B. Embodiments of an optical transmitter comprising a plurality of optical phased arrays (OPAs) will be described using FIG. 5. Methods of operating the OPAs and/or optical transmitters will be described using FIGS. 4 and 6.

Figure 1:
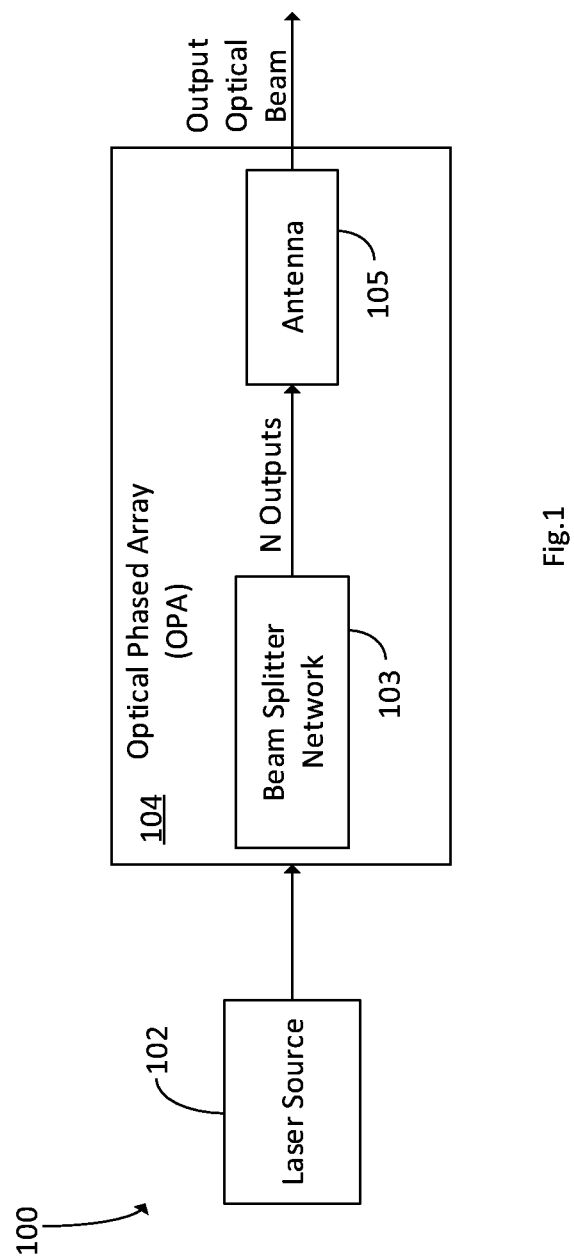
FIG. 1 illustrates a schematic diagram of a beam steering device according to an embodiment of the present application.

FIG. 1 is a schematic diagram of a beam steering device according to an embodiment of the present application.

Referring to FIG. 1, the beam steering device 100 may include a laser source 102 coupled to an optical phased array (OPA) 104. The OPA 104 may be formed on a silicon based platform such as silicon nitride using silicon photonics technology known in the art. The laser source 102 may be coupled to the OPA 104 via an optical fiber or may be included in the OPA 104.

In various embodiments, the OPA 104 may comprise a beam splitter network 103 configured to split the laser beam generated by the laser source 102 into N outputs. The N outputs may be coupled to an antenna 105 configured to couple and emit the each of N outputs into free space forming an optical output beam. The OPA 104 will be described in more detail in FIGS. 2A-2B as well as FIGS. 3A-3B below. As described in various embodiments, the OPA 104 may be configured to electronically steer the beam over a wider angle to obtain improved coverage area.

Figure 2A:
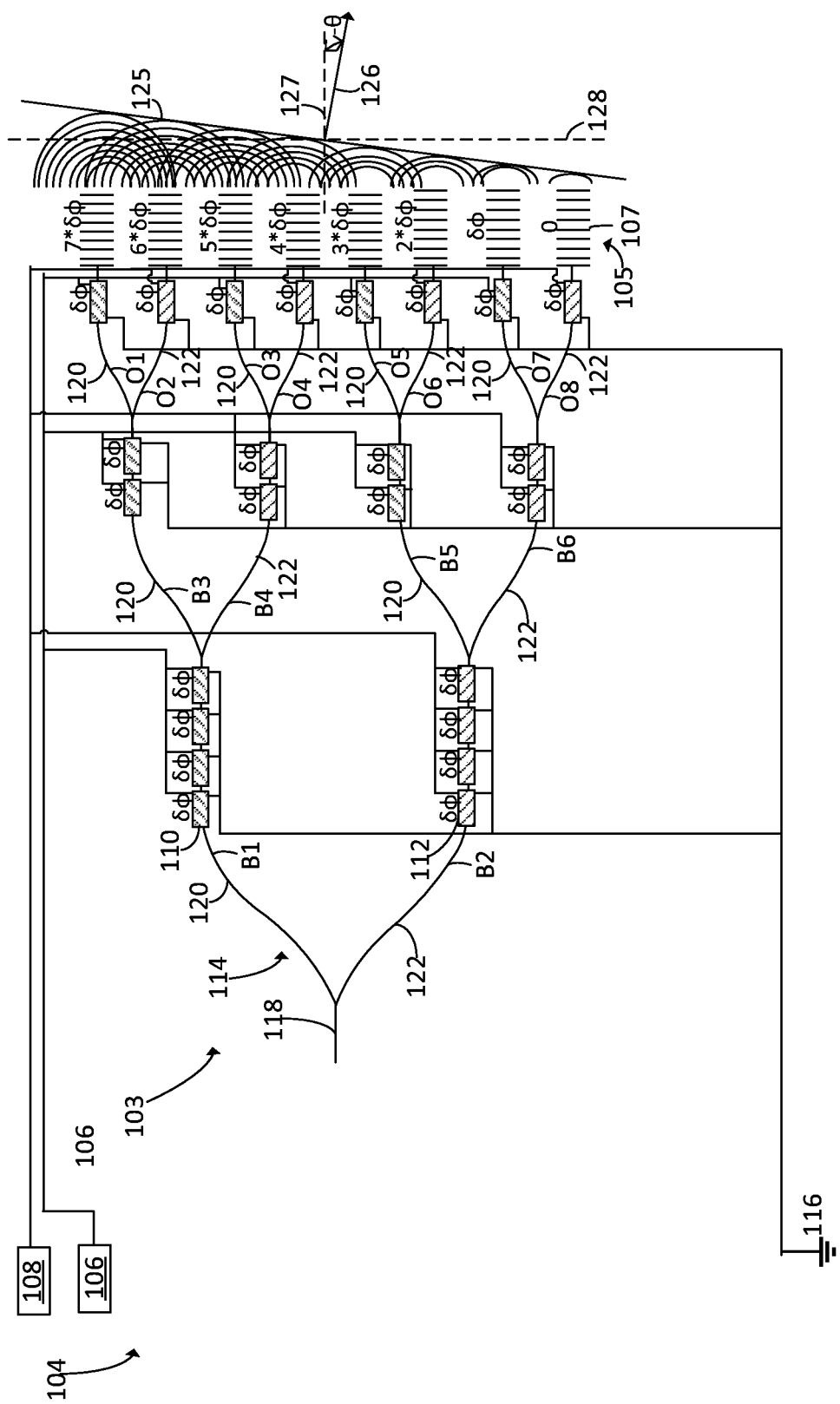
FIGS. 2A-2C illustrate schematic diagrams of an optical phased array of a beam steering device configured to steer a beam around a central beam axis according to an embodiment of the present application, where
Figure 2B:
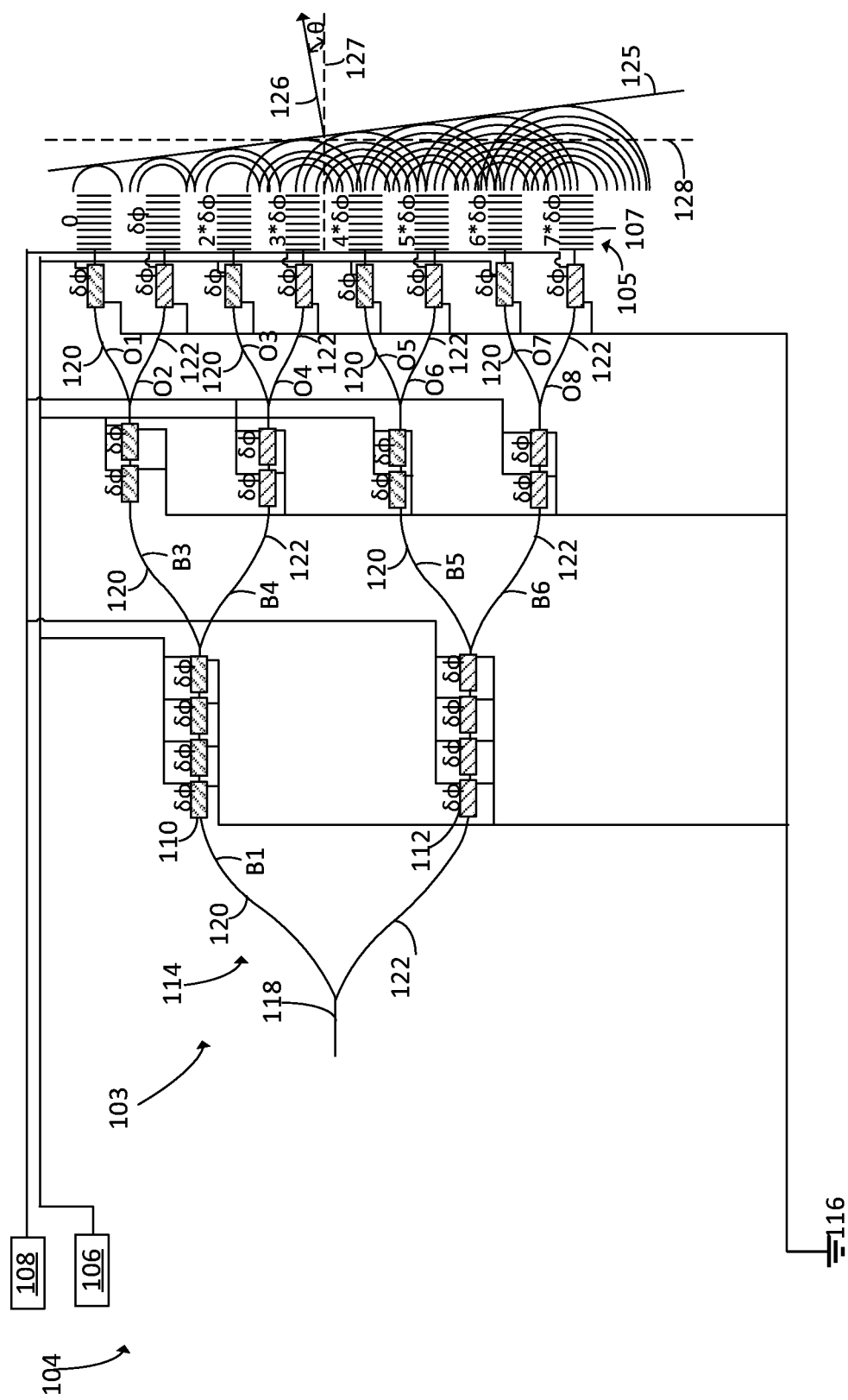

FIGS. 2A-2B are schematic diagrams of an optical phase array (OPA) configured to steer an output optical beam with improved coverage.

FIGS. 2A-2B illustrate schematic diagrams of an optical phased array of a beam steering device configured to steer a beam around a central beam axis according to an embodiment of the present application where FIG. 2A illustrates a schematic diagram of the optical phased array when it is configured to steer an output optical beam in a first direction, and FIG. 2B illustrates a schematic diagram of the optical phased array when it is configured to steer the output optical beam in a second direction opposite the first direction.

Referring to FIG. 2A, the optical phased array (OPA) 104 may comprise a beam splitter network 103 having an output comprising a plurality of N outputs generated around a central beam axis 127, a first network of first phase shifters 110, and a second network of second phase shifters 112. The beam splitter network 103 may be configured to spilt a laser beam generated by the laser source 102 into the plurality of N outputs to generate an output optical beam 126. The beam splitter network 103 may comprise a plurality of stages of optical beam splitters 114. The optical beam splitters 114 may comprise 1×2 Y-junction tree or multimode interference (MMI) optical splitters. Each of the optical beam splitters 114 may include an input 118, a first output waveguide 120, and a second output waveguide 122.

The beam splitter network 103 may comprise i stages of optical beam splitters 114, where i is an integer greater than or equal to 1. The value of i may be determined based on the desired value of N outputs using the formula, $N=2^i$. For example, as illustrated in FIG. 2A, an 8 output beam splitter network 103 may require three stages of optical beam splitters 114 (i.e., $8=2^3$). Although FIG. 2A illustrates an OPA 104 with 8 outputs, the OPA 104 may support any suitable quantity of outputs.

The quantity of optical beam splitters 114 may increase between each progressive stage. In various embodiments, each stage of the beam splitter network 103 may comprise $2^{i-1}$ optical beam splitters 114. For example, a first stage of the beam splitter network 103 (i.e., i=1) may include 1 optical beam splitter 114, a second stage of the beam splitter network 103 (i.e. i=2) may include 2 optical beam splitters 114, and the third stage of the beam splitter network 103 (i.e. i=3) may include 4 optical beam splitters 114.

The first output waveguides 120 and the second output waveguides 122 of the final stage of the beam splitter network 103 may each be coupled to an antenna 105. The antenna 105 may be an array antenna. The antenna 105 may comprise arrays of gratings 107. In one or more embodiments, the arrays of gratings 107 may comprise linear gratings. The length of each the linear gratings may be equal. In other words, the N outputs of the beam splitter network 103 may each be further coupled to an array of gratings 107.

The optical phased array (OPA) 104 may also include a first network of first phase shifters 110 configured to steer the output optical beam 126 in a first direction away from a longitude direction 128 and a second network of second phase shifters 112 configured to steer the output optical beam 126 in a second direction away from the longitude direction 128 opposite to the first direction.

In various embodiments, the first network of first phase shifters 110 may each be coupled to a first driver 106. The second network of second phase shifters 112 may each be coupled to a second driver 108. Each of the first phase shifters 110 and the second phase shifters 112 may be connected to common reference potential such as a ground terminal 116.

Each of the first output waveguides 120 of the beam splitter network 103 may be associated to at least one first phase shifter 110. The first output waveguide 120 of each stage may be associated with a different quantity of first phase shifters 110. The quantity of first phase shifters 110 associated with the first output waveguides 120 on an $i^{th}$ stage of the beam splitter network 103 may be equal to $$\frac{N}{2^i}.$$

For example, as illustrated in FIG. 2A, the first output waveguide 120 of an optical beam splitter 114 in a first stage (i.e. i=1) may be associated to four first phase shifters 110, the first output waveguide 120 of each optical beam splitter 114 in a second stage (i.e. i=2) may be associated to 2 first phase shifters 110, and the first output waveguide 120 of each optical beam splitter 114 in a third stage (i.e. i=3) may be associated to 1 first phase shifter 110.

Similarly, each of the second output waveguides 122 of the beam splitter network 103 may be associated to at least one second phase shifter 112. The quantity of second phase shifters 112 may be equal to the quantity of first phase shifters 110 in each stage of the beam splitter network 103.

For example, as illustrated in FIG. 2A, the second output waveguide 122 of an optical beam splitter 114 in a first stage (i.e. i=1) may be associated to four second phase shifters 112, the second output waveguide 122 of each optical beam splitter 114 in a second stage (i.e. i=2) may be associated to two second phase shifters 112, and a second output waveguide 122 of each optical beam splitter 114 in a third stage (i.e. i=3) may be associated to one second phase shifter 112. The first phase shifters 110 and the second phase shifters 112 may be identical. The first phase shifters 110 and the second phase shifters 112 may comprise thermal or electro-optical phase shifters.

Advantageously, coupling both of the networks of phase shifters to a single respective driver allows the quantity of N outputs to be increased without requiring additional drivers.

As described above, the optical phased array (OPA) 104 may be configured to steer the output optical beam 126 in opposite directions away from the longitude direction 128. As understood by those with ordinary skill in the art, the output optical beam 126 may have a phase front 125. The first direction may be defined as either a positive beam steering angle θ or a negative beam steering angle −θ measured with respect to a central beam axis 127. The second direction may be defined as a beam steering angle with the opposite sign. In various embodiments, the central beam axis 127 may be located along an axis that may be at an angle to the beam steering device 100 (See FIG. 2C).

In the example of FIG. 2A, the first network of first phase shifters 110 may be configured to steer the output optical beam 126 in a first direction −θ away from the longitude direction 128.

The output optical beam 126 may be steered in the first direction −θ by activating the first driver 106. When activated, the first driver 106 may apply a first potential to each of the first phase shifters 110. The first potential may configure the first phase shifters 110 to add a first phase offset to each optical beam passing through the first output waveguides 120. Each of the first phase shifters 110 that an optical beam passes through may add a phase shift of δΦ. When the first driver 106 is activated, and the second driver 108 is idle, the first phase offset added to each beam traveling through the first output waveguides 120 may equal $$\frac{N}{2^i}*\delta\Phi.$$

Each of the beams traveling through the second output waveguides 122 may not undergo a phase shift. This may result in a constant phase difference equal to −δΦ between adjacent N outputs along the longitude direction 128 (or vice versa).

For example, in a first stage of the beam splitter network 103, the laser beam generated from the laser source 102 may be split an optical beam splitter 114 into a first beam B1 traveling along a first path through the first output waveguide 120 and a second beam B2 traveling along a second path through the second output waveguide 122. A first phase offset may not be added to the second beam B2 because it does not pass through any first phase shifters 110. A first phase offset equal to δΦ may be added to the first beam B1 by each of the four first phase shifters 110 it passes through so that the total phase offset is equal to 4*δΦ.

In a second stage of the beam splitter network 103, a two optical beam splitters 114 may be configured to split the first beam B1 into a third beam B3 traveling along a third path and a fourth beam B4 traveling along a fourth path, and split the second beam B2 into a fifth beam B5 traveling along a fifth path and a sixth beam B6 traveling along a sixth path. The third beam B3 and the fifth beam B5 may each travel through a first output waveguide 120 of one of the two optical beam splitters 114, while the second beam B2 and fourth beam B4 may each travel through a second output waveguide 122 of one of the two optical beam splitters 114. The third beam B3 and the fifth beam B5 may each pass through two first phase shifters 110 while the fourth beam B4 and sixth beam B6 do not. An additional first phase offset of 2*δΦ may be added to both the third beam B3 and fifth beam B5 from the two first phase shifters 110 they both pass through. An additional first phase offset may not be added to the fourth beam B4 and sixth beam B6 because they do not pass through any first phase shifters 110. Therefore, a first phase offset equal to 6*δΦ has been added to the third beam B3, a first phase offset equal to 4*δΦ has been added to the fourth beam B4, a first phase offset equal to 2*δΦ has been added to the fifth beam B5, and a first phase offset had not been added to the sixth beam B6.

At the final stage of the beam splitter network 103 each of the optical beam splitters 114 may split a respective beam into 2 outputs. The index of each of the N outputs may be defined as n and range from 1 to N along the longitude direction 128. Referring back to FIG. 2A, the third through sixth beams may each be split into 2 outputs by each of the four optical beam splitters 114, resulting in eight outputs. The third beam B3 may be split into a first output O1 (e.g. n=1) and a second output O2, the fourth beam B4 may be split into a third output O3 and a fourth output O4, the fifth beam B5 may be split into a fifth output O5 and a sixth output O6, and the sixth beam B6 may be split into a seventh output O7 and an eighth output O8.

In the same manner discussed above, the beams traveling through each first output waveguide 120 of each optical beam splitter 114 of the third (and final) stage will pass through one first phase shifter 110 while the other beams do not. Thus, an additional first phase offset equal to δΦ may be added to the beams traveling through each of the first output waveguides 120. The N outputs with odd n values (i.e. first, third, fifth, and seventh) may pass through the first output waveguides 120 while the N outputs with even n values (i.e. second, fourth, sixth, eighth) may pass through the second output waveguides 122. Therefore, the beam corresponding to the first output O1 may have a first phase offset equal to 7*δΦ, the beam corresponding to the second output O2 may have a first phase offset equal 6*δΦ, the beam corresponding to the third output O3 may have a first phase offset equal to 5*δΦ, the beam corresponding to the fourth output O4 may have a first phase offset equal to 4*δΦ, the beam corresponding to the fifth output O5 may have a first phase offset equal to 3*δΦ, the beam corresponding to the sixth output O6 may have a first phase offset equal to 2*δΦ, the beam corresponding to the seventh output O7 may have a first phase offset equal to δΦ, and a first phase offset may not be added to the beam corresponding to the eighth output.

Therefore, the first phase offset added to each of the N outputs may be equal to (N−n)δΦ. The first phase offset added to each of the N outputs may range from (N−n)δΦ to 0 with a constant phase difference along the longitude direction 128, regardless of the value of N. This may result in a negative constant phase difference −δΦ between N outputs along longitude direction 128. Therefore, the first phase shifters 110 may steer the output optical beam 126 in the first direction −θ (or vice versa).

As understood by those with ordinary skill in the art, the first phase shifters 110 may configure a phase difference with either a positive sign or a negative sign based on the first potential so as to result in a positive or negative beam direction with respect to the longitude direction 128. In other words, the first network of first phase shifters 110 may be configured to only steer the output optical beam 126 with only either a positive beam steering angle θ or a negative beam steering angle −θ. Advantageously, the second network of second phase shifters 112 may be configured to provide a phase shift with the opposite sign. One advantage of this is that it allows for the output optical beam 126 to be steered in both directions of the central beam axis 127. In other words, the range of the beam steering angle may be doubled.

Referring to FIG. 2B, after steering the beam in the first direction −θ, the first driver 106 may be deactivated, and the second driver 108 may be activated. The second driver 108 may transmit a second potential to each of the second phase shifters 112. In various embodiments, the second potential may be the same as the first potential.

The second potential may configure the second phase shifters 112 to steer the output optical beam 126 in a second direction θ. The second direction may be defined as a positive beam steering angle θ or a negative beam steering angle −θ so long as it is opposite the first direction.

The second potential may configure the second phase shifters 112 to add a second phase offset to each optical beam passing through the second output waveguides 122. The second phase offset may be different than the first phase offset. In various embodiments, the added second phase offset may be opposite to the first phase offset. In other words, the phase difference between N outputs along the longitude direction 128 provided by the first phase shifters 110 and the second phase shifters 112 may have opposite signs. The second phase difference added to each of the N outputs may be equal to (n−1)δΦ. This will be discussed in more detail below.

Continuing the example discussed in FIG. 2A above, in the first stage of the beam splitter network 103 a second phase offset equal to 4*δΦ may only be added to the second beam B2 due to each of the four second phase shifters 112 it passes through.

In the second stage of the beam splitter network, a second phase offset of 2*δΦ may only be added to the fourth beam B4 and sixth beam B6 due to the two second phase shifters 112 they both pass through.

In the final stage of the beam splitter network, a second phase offset of δΦ may only be added to N outputs with even indices (i.e. second, fourth, sixth, and eighth) due to the one second phase shifter 112 they pass through.

Therefore, a second phase offset may not be added to the beam corresponding to the first output O1, the beam corresponding to the second output O2 may have a second phase offset equal to δΦ, the beam corresponding to the third output O3 may have a second phase offset equal to 2*δΦ, the beam corresponding to the fourth output O4 may have a second phase offset equal to 3*δΦ, the beam corresponding to the fifth output O5 may have a second phase offset equal to 4*δΦ, the beam corresponding to the sixth output O6 may have a second phase offset equal to 5*δΦ, the beam corresponding to the seventh output O7 may have a second phase offset equal to 6*δΦ, and the beam corresponding to the eighth output O8 may have a second phase offset equal to 7*δΦ.

Advantageously, this may allow the output optical beam 126 to be steered in a second direction θ away from the longitude direction 128. One advantage of this is that it doubles the range of the beam steering angle.

Embodiments of the present application contemplate situations where an optical phased array (OPA) 104 may be configured to have a central beam axis 127 disposed at a fixed offset angle. Advantageously, this allows for an output beam to be positioned and steered around a central beam axis 127 pointing in different directions.

Figure 2C:
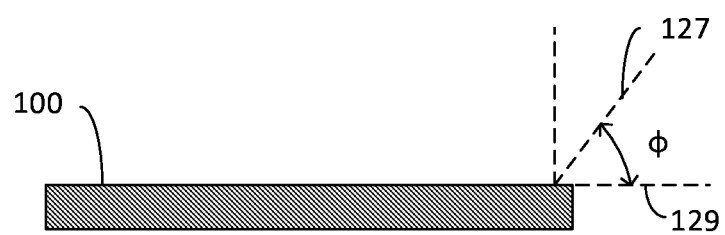

FIG. 2C illustrates a side view of the beam steering device. FIG. 2C functions to provide an understanding of how the central beam axis 127 is located away from a device axis 129 perpendicular to the beam steering device 100. Referring to FIG. 2C, as understood by those with ordinary skill in the art, the output optical beam 126 and the central beam axis 127 may be formed in the half-space above the device 100. In other words, the central beam axis 127 may be disposed at an emission angle Φ measured with respect to the device axis 129. This is because light emission from the antenna is at an angle to the surface of the device 100 referred herein as the emission angle Φ.

Figure 3A:
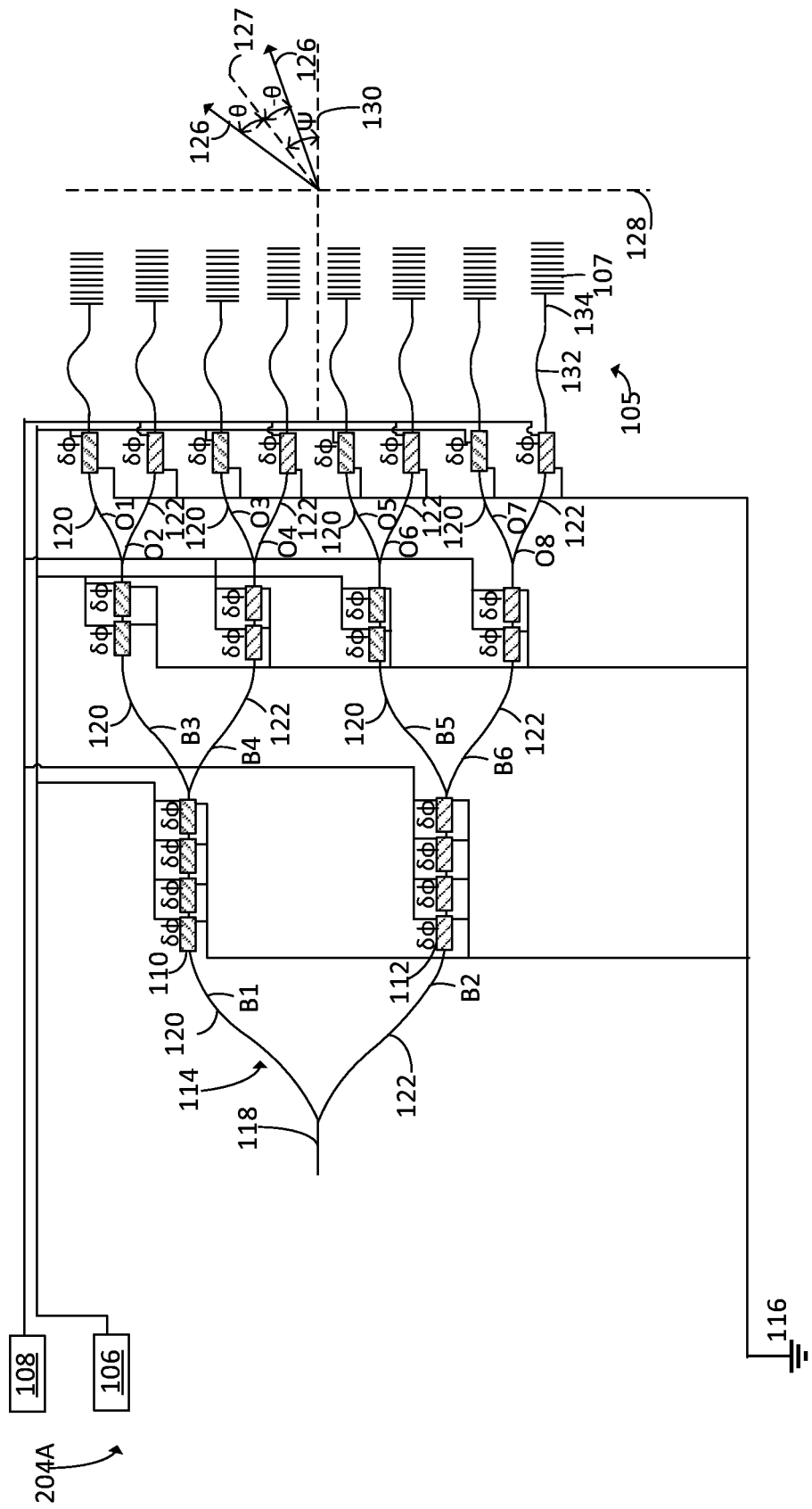
FIGS. 3A-3B illustrate schematic diagrams of an optical phased array of a beam steering device according to an embodiment of the present application, where
Figure 3B:
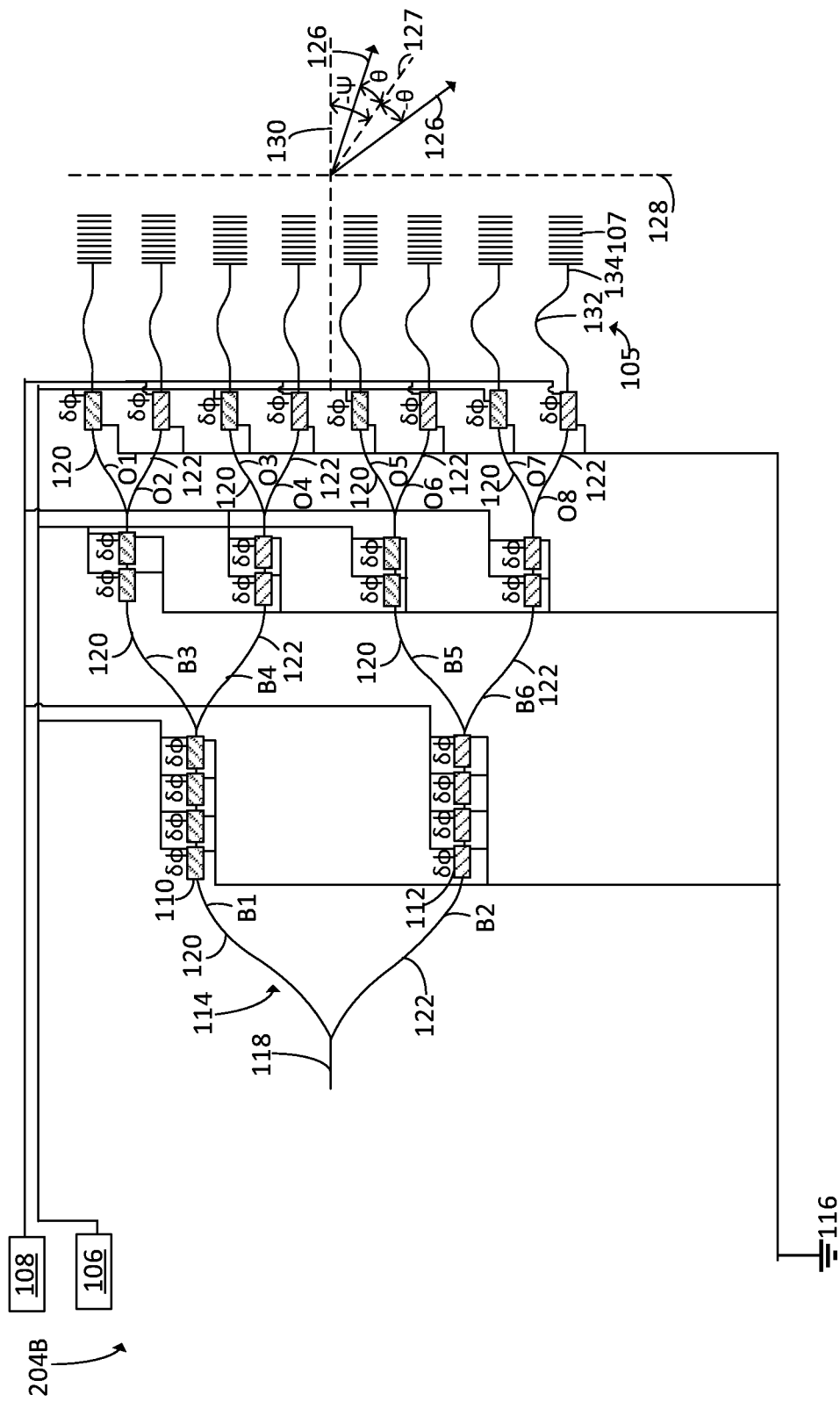

FIGS. 3A-3B illustrate schematic diagrams of an optical phased array of a beam steering device according to an embodiment of the present application, where FIG. 3A illustrates a schematic diagram of an optical phased configured to have a central beam axis disposed at an offset angle in a first direction, and FIG. 3B illustrates a schematic diagram of an optical phased configured to have a central beam axis disposed at an offset angle in a second direction.

Unlike the prior embodiments in which the central beam axis was symmetrically located along the main axis, in these embodiments, the central beam axis is offset at an angle to the main axis. In other words, the beam angle is not symmetric with the main axis. As will be described in the embodiment of FIGS. 5A-5B, these OPAs enable a larger spread in beam angle in the beam steering device.

Referring to FIG. 3A, a positive offset angle OPA 204A may be further configured to have a central beam axis 127 disposed in a first direction away from a main axis 130 perpendicular to the antenna 105. The first direction may be defined as an offset angle Ψ between the central beam axis 127 and the main axis 130 perpendicular to the antenna 105. For example, a central beam axis 127 disposed in the first direction may be defined as a central beam axis 127 with a positive fixed offset angle Ψ (or vice versa).

In various embodiments, the antenna 105 may further include N linear waveguides 134 and a plurality of N fixed phase shifters 132. The plurality of N fixed phase shifters 132 may be coupled between the beam splitter network 103 and the N linear waveguides 134. In other words, the inputs of N fixed phase shifters 132 may be coupled to the N outputs of the beam splitter network 103 and the outputs of the N fixed phase shifters 132 may be coupled to the inputs of each of the N linear waveguides 134.

Each of the N fixed phase shifters 132 may have different optical path lengths. The difference of the optical path length between each of the N fixed phase shifters 132 may be equal. In various embodiments, the optical path length of each of the N fixed phase shifters 132 may decrease along the longitude direction 128 to form a fixed offset angle $\Psi$ in the first direction. As understood by those with ordinary skill in the art, the direction of the fixed offset angle $\Psi$ will be in the direction of increasing optical path lengths. Also, the longer the optical path length of the N fixed phase shifters 132, the greater the magnitude of the fixed offset angle $\Psi$. Therefore, the magnitude and direction of the fixed offset angle $\Psi$ may be configured based on the optical path lengths of each of the N fixed phase shifters 132.

Referring back to FIG. 3A, each of the N fixed phase shifters 132 may comprise N curved waveguides with different curvatures. As understood by those with ordinary skill in the art, the greater the curvature, the longer the optical path length (or vice versa). Therefore, the decrease in optical path lengths may be realized by decreasing the curvature of the N fixed phase shifters 132 along the longitude direction 128.

Referring to FIG. 3B, a negative offset angle OPA 204B may be further configured to have a central beam axis 127 disposed in a second direction away from the main axis 130. The second direction may be opposite the first direction. For example, the second direction may be defined as a negative fixed offset angle $-\Psi$ (or vice versa), so long as it is opposite the first direction.

For the same reasons discussed above, the magnitude and sign of the second direction may depend on the difference in optical path length of the N fixed phase shifters 132. Therefore, the central beam axis 127 may be disposed in with a negative fixed offset angle $-\Psi$ by increasing the optical path length (or curvature) of each of the N fixed phase shifters 132 along the longitude direction 128.

Figure 4:
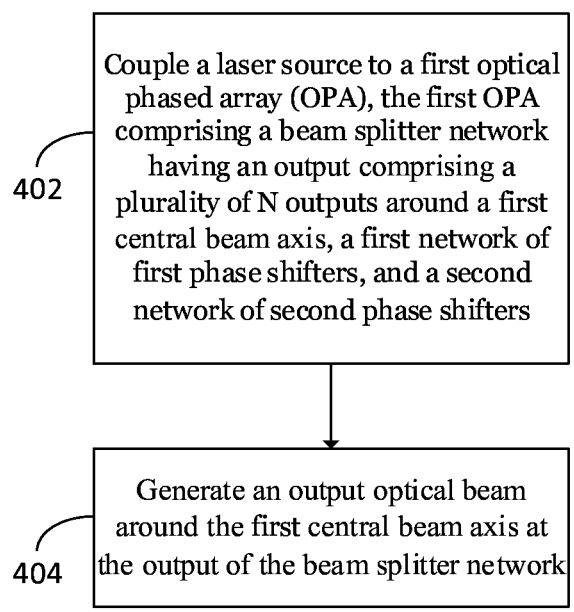
FIG. 4 illustrates a process flow of steering an output optical beam with improved coverage according to an embodiment of the present application.

FIG. 4 illustrates a process flow of steering an output optical beam with improved coverage according to an embodiment of the present application.

As illustrated in block 402, and described with reference to FIGS. 2A-3B, a laser source 102 may be coupled to an optical phased array (OPA) 104 (or 204A, 204B). The OPA 104 (or 204A, 204B) may comprise a beam splitter network 103 comprising a plurality of N outputs around a central beam axis 127, a first network of first phase shifters 110, and a second network of second phase shifters 112. The OPA 104 (or 204A, 204B) may have any of the configurations disclosed in FIGS. 2A-2B and FIGS. 3A-3B.

As next illustrated in block 404, and described with reference to FIGS. 2A-3B, an output optical beam 126 may be generated around a central beam axis 127 at the output of the beam splitter network 103. The output optical beam 126 may be formed around the central beam axis by being steered in a first direction $-\theta$ and a second direction $\theta$ (or vice versa).

The output optical beam 126 may be steered in the first direction by applying a first potential to each of the first phase shifters 110 with the first driver 106. The first direction may be a positive beam steering angle $\theta$ or a negative beam steering angle $-\theta$. The output optical beam 126 may be steered in the first direction in the same manner described in FIG. 2A.

The output optical beam 126 may be steered in a second direction away from the central beam axis 127. The output optical beam 126 may be steered in the second direction by deactivating the first driver 106 and supplying a second potential to each of the second phase shifters 112 using the second driver 108. The second direction may be defined as a beam steering angle with an opposite sign of the first direction. The output optical beam 126 may be steered in the first direction in the same manner described in FIG. 2B.

The order of the direction of steering the output optical beam 126 is not limited by this application. In other words, the beam may be steered in the second direction prior to the first direction.

Embodiments of the present application contemplate a beam steering device comprising a plurality of optical phased arrays (OPAs) to increase the range of coverage of a beam steering device without requiring additional circuitry.

Figure 5A:
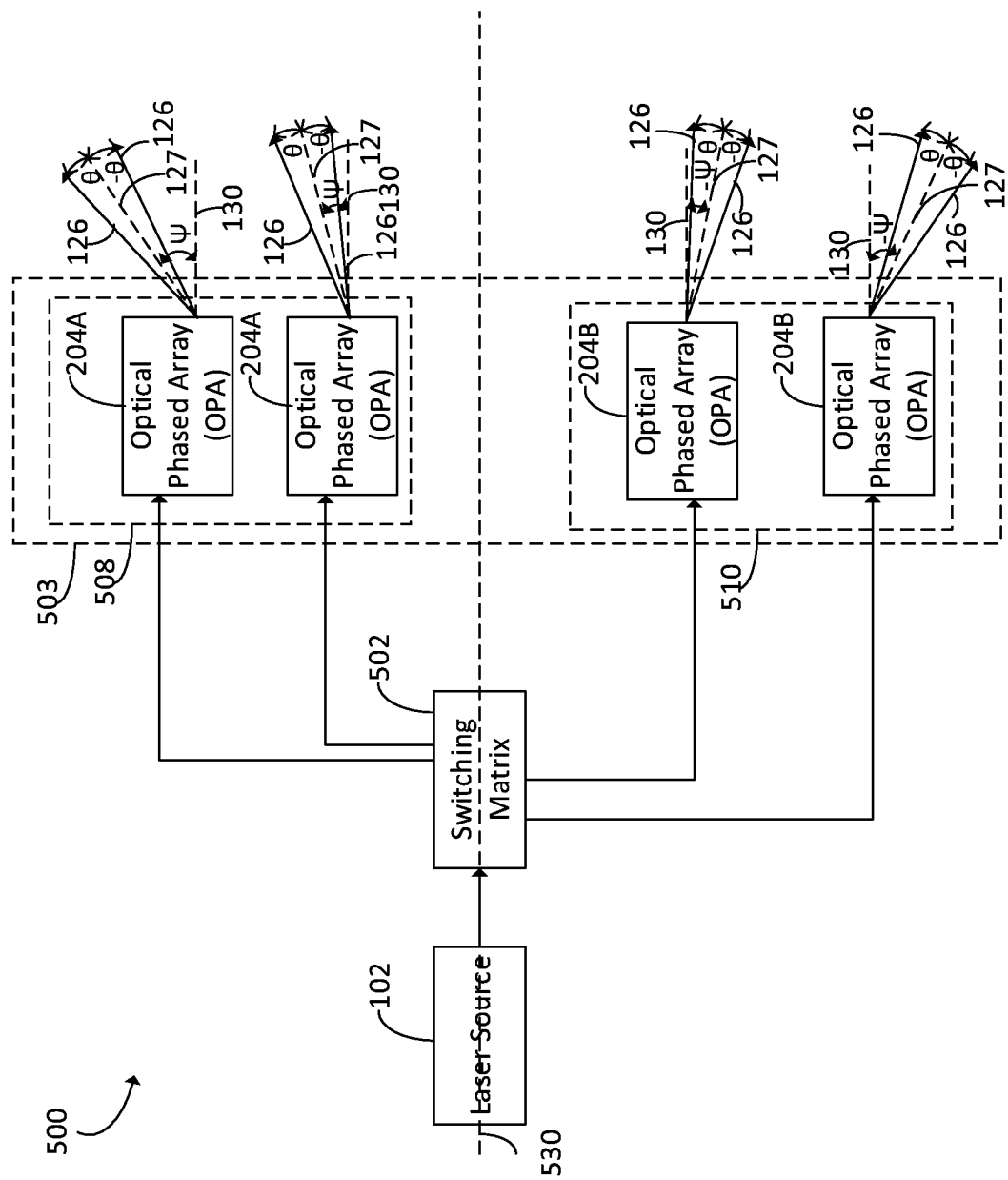
FIGS. 5A-5B illustrate schematic diagrams of a beam steering device comprising a plurality of optical phased arrays (OPAs) according to an embodiment of the present application, where
Figure 5B:
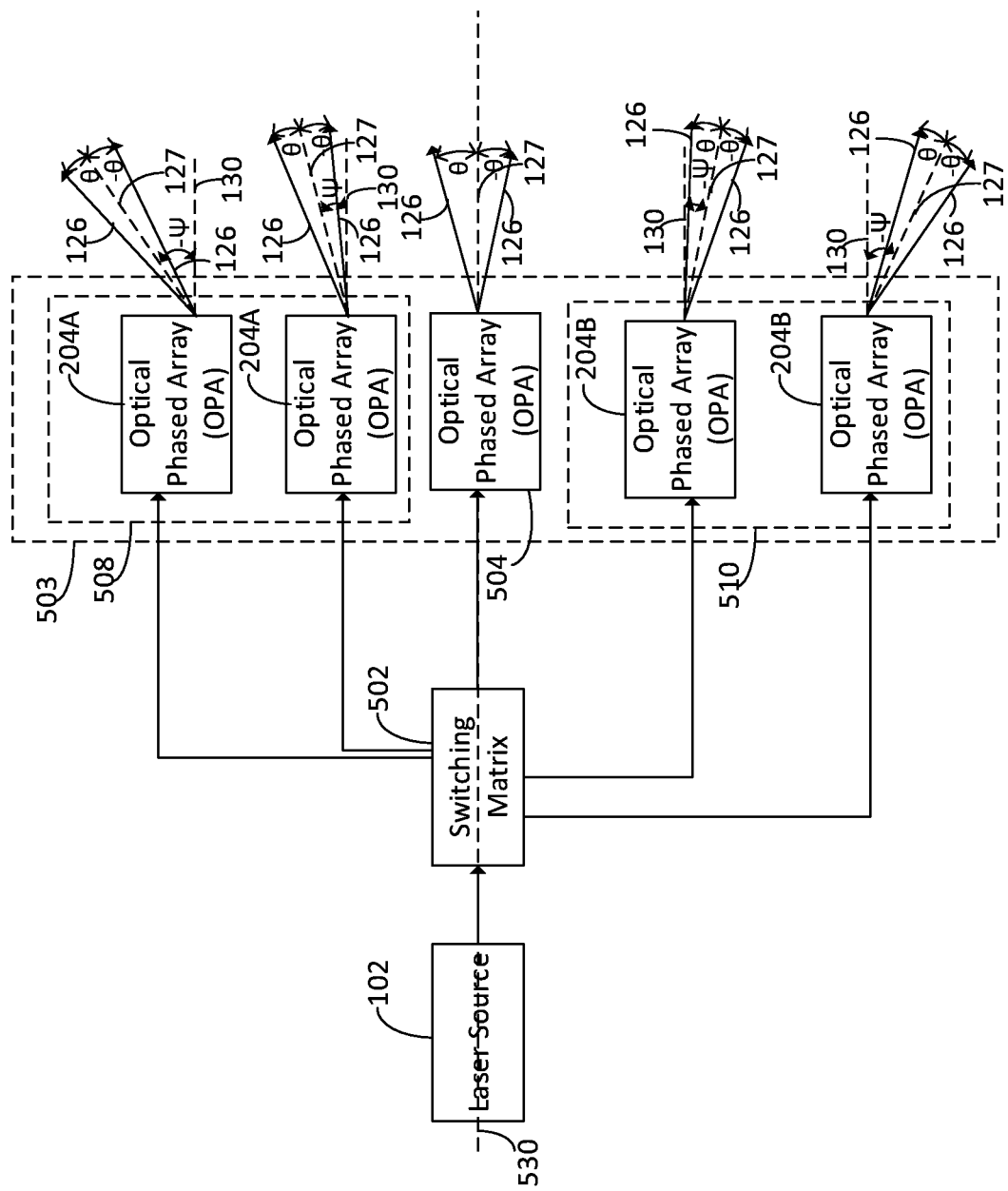

FIGS. 5A-5B illustrate schematic diagrams of a beam steering device comprising a plurality of optical phased arrays (OPAs) according to an embodiment of the present application, where FIG. 5A illustrates a beam steering device with an even number of optical phased arrays (OPAs), and FIG. 5B illustrates a beam steering device with an odd number of optical phased arrays (OPAs).

Referring to FIG. 5A, an optical beam steering device 500 may comprise a laser source 102 coupled to the input of a switching matrix 502. The switching matrix 502 may comprise a plurality of z outputs that are coupled to a plurality of OPAs 503. The switching matrix 502 may be configured to sequentially guide a laser beam emitted by the laser source 102 around a main axis 530 to each of the plurality of OPAs 503.

In various embodiments, the central beam axis 127 of each of the plurality of OPAs 503 may be different. This will be explained in more detail below.

Referring back to FIG. 5A, in embodiments, where z is an even number, the central beam axis 127 of each of the plurality of OPAs 503 may be configured to be disposed around the main axis 530. In other words, the central beam axis 127 of each of the plurality of OPAs 503 may be configured to be disposed with a different fixed offset angle $\Psi$. The magnitude of the fixed offset angle $\Psi$ of each central beam axis 127 may be configured to increase away from the main axis 530.

The plurality of OPAs 503 may include a first set of OPAs 508 and a second set of OPAs 510. The first set of OPAs 508 may include each of the OPAs positioned above the main axis 530. The second set of OPAs 510 may comprise each of the OPAs positioned below the main axis 530. The first set of OPAs 508 and the second set of OPAs 510 may comprise the same quantity of OPAs.

Similar to the positive offset angle OPA 204A in FIG. 3A, the first set of OPAs 508 may each have a central beam axis 127 configured to have positive fixed offset angles 1 increasing in magnitude away from the main axis 530 (similar to the OPA described with respect to FIG. 3A).

Similar to the negative offset angle OPA 204B in FIG. 3B, the second set of OPAs 510 may each have a central beam axis 127 configured to have negative fixed offset angles $-\Psi$ increasing in magnitude away from the main axis 530 (or vice versa).

As described above, the OPAs in the first set of OPAs 508 may include N fixed phase shifters 132 with decreasing optical path lengths along the longitude direction 128. The OPAs in the second set of OPAs 510 may include N fixed phase shifters 132 with increasing optical path lengths along the longitude direction 128. In other words, the longest fixed phase shifter of an OPA in the first set of OPAs 508 that is closer to the main axis 530 will be shorter than the shortest fixed phase shifter in an OPA in the first set of OPAs 508 further away from the main axis 530. The same applies to the second set of OPAs 510. Also, the optical path length of each of the N fixed phase shifters 132 of an OPA in the first set of OPAs 508 and an OPA in the second set of OPAs 510 that are equidistant from the main axis 530 may be equal. Therefore, the magnitude of fixed offset angles Ψ of OPAs that are equidistant from the main axis 530 may be equal. Advantageously, this allows for the central beam axis 127 of each of the plurality of OPA's 503 to increase away from the main axis 530. One advantage of this is that it allows for increased beam coverage for the optical beam steering device 500 without additional circuitry. In other words, the switching matrix 502 may be used to steer the direction of the output of the optical beam steering device 500 by sequentially switching between the plurality of OPAs 503.

FIG. 5B illustrates an alternative embodiment of the beam steering device, which works without having any possible central blindness. While the embodiment described in FIG. 5A is optimized to steer the beam over a wider angle, the device may not be effective in analyzing objects that are located in the main axis of the device. To offset any such deficiencies, this embodiment includes an additional OPA that is centrally located.

Referring to FIG. 5B, in embodiments where z is an odd integer, the first set of OPAs 508 and the second set of OPAs 510 may be separated by a central OPA 504 and positioned along the main axis 530. The central OPA 504 positioned along the main axis 530 may be configured to have a central beam axis 127 formed along the main axis 530. Therefore, the central beam axis 127 of the central OPA 504 does not have a fixed offset angle and therefore the central OPA 504 is similar to the OPA 104 described in FIGS. 2A-2B.

Figure 6:
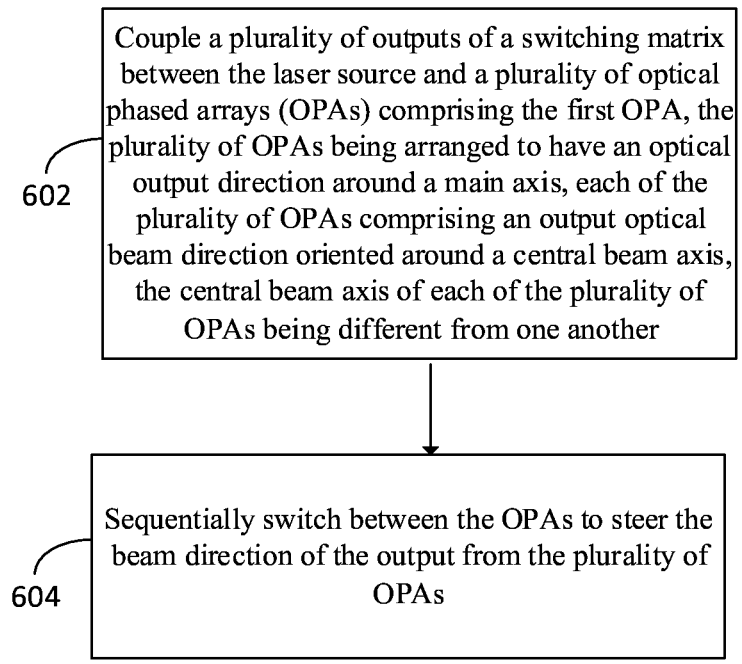
FIG. 6 illustrates a process flow of controlling a beam steering device including a plurality of optical phased arrays (OPAs) according to an embodiment of the present application.

FIG. 6 illustrates a process flow of controlling a beam steering device including a plurality of optical phased arrays (OPAs) according to an embodiment of the present application.

As illustrated in block 602 and described with reference to FIGS. 5A-5B, a plurality of outputs of a switching matrix 502 may be coupled between laser source 102 and a plurality of optical phased arrays (OPAs) 503. Each of the plurality of OPAs 503 may be configured to have an optical output direction around a main axis 530. As described above, each of the plurality of OPAs 303 may be configured to generate an output optical beam 126 around a different central beam axis 127. The central beam axis 127 of each of the plurality OPAs 503 may be disposed around the main axis 530. Each central beam axis 127 may be disposed around the main axis 530 in the same manner discussed in FIGS. 5A-5B.

As next illustrated in block 604 and described with reference to FIGS. 5A-5B, the switching matrix 502 may be used to sequentially switch between the plurality of OPAs 503 to steer the direction of the optical output from the plurality of OPAs 503. As described above, this allows for an optical beam steering device 500 with an improved coverage without requiring additional circuitry.

Example embodiments of the present invention are summarized here. Other embodiments can also be understood from the entirety of the specification and the claims filed herein.

Example 1. An optical beam steering device including: a laser source coupled to an optical phased array (OPA), the OPA including: a beam splitter network optically coupled to the laser source and configured to split a laser beam generated by the laser source into N outputs to generate an output optical beam; a first network of first phase shifters configured to steer the output optical beam in a first direction away from a longitude direction; and a second network of second phase shifters configured to steer the output optical beam in a second direction away from the longitude direction, the second direction being opposite to the first direction.

Example 2. The optical beam steering device of example 1, where the beam splitter network includes a plurality of stages of optical beam splitters, each optical beam splitter having an input, a first output waveguide, and a second output waveguide, each first output waveguide of the optical beam splitter being associated with one of the first phase shifters and each second output waveguide of the optical beam splitter being associated with one of the second phase shifters, the first phase shifters being configured to add a first phase offset to an optical beam passing through the first output waveguide, the second phase shifters being configured to add a second phase offset to an optical beam passing through the second output waveguide.

Example 3. The optical beam steering device of one of examples 1 or 2, where the first output waveguide and the second output waveguide of a final stage of each of the plurality of stages of optical beam splitters are each connected to an array of linear gratings.

Example 4. The optical beam steering device of one of examples 1 to 3, where an $i^{th}$ stage of the plurality of stages of optical beam splitters includes: 2i−1 1×2 optical splitters, and where i is an integer greater than or equal to 1.

Example 5. The optical beam steering device of one of examples 1 to 4, where the first network of first phase shifters includes: a first driver coupled to each of the first phase shifters, the first driver configured to configure the first phase shifters to provide a first phase offset.

Example 6. The optical beam steering device of one of examples 1 to 5, where the second network of second phase shifters includes: a second driver coupled to each of the second phase shifters, the second driver being configured to configure the second phase shifters to provide a second phase offset different from the first phase offset.

Example 7. The optical beam steering device of one of examples 1 to 6, where the first phase shifters and the second phase shifters are identical.

Example 8. The optical beam steering device of one of examples 1 to 7, where first phase offset is opposite to the second phase offset.

Example 9. The optical beam steering device of one of examples 1 to 8, where the first network of first phase shifters and the second network of second phase shifters include thermal or electro-optical phase shifters.

Example 10. The optical beam steering device of one of examples 1 to 9, further including: an antenna including N linear waveguides, the N linear waveguides corresponding to the N outputs; and N fixed phase shifters coupled to the beam splitter network, each of the N fixed phase shifters having a different optical path length than another one of the N fixed phase shifters, and each of the N linear waveguides being coupled to an output of one of the N fixed phase shifters.

Example 11. The optical beam steering device of one of examples 1 to 10, further including a switching matrix coupled between the laser source and the OPA.

Example 12. An optical beam steering device including: a switching matrix including a plurality of z outputs coupled to a plurality of optical phased arrays (OPAs) and configured to guide a laser beam emitted by a laser source sequentially to the plurality of OPAs, the laser being emitted around a main axis, each of the plurality of OPAs including an output optical beam direction oriented around a central beam axis, the central beam axis of each of the plurality of OPAs being different from one another, each of the plurality of OPAs including: a beam splitter network coupled to the laser source configured to split the laser beam into N outputs to generate a corresponding output optical beam, a first network of first phase shifters configured to steer the output optical beam in a first direction away from the central beam axis, and a second network of second phase shifters configured to steer the output optical beam in a second direction away from the central beam axis, the second direction being opposite to the first direction.

Example 13. The optical beam steering device of example 12, where the beam splitter network includes a plurality of stages of optical beam splitters, each optical beam splitter having an input, a first output waveguide, and a second output waveguide, each first output waveguide of the optical beam splitter being associated with one of the first phase shifters and each second output waveguide of the optical beam splitter being associated with one of the second phase shifters, the first phase shifters being configured to add a first phase offset to an optical beam passing through the first output waveguide, the second phase shifters being configured to add a second phase offset to an optical beam passing through the second output waveguide.

Example 14. The optical beam steering device of one of examples 12 or 13, where an $i^{th}$ stage of the plurality of stages of optical beam splitters includes 2i−1 1×2 optical splitters.

Example 15. The optical beam steering device of one of examples 12 to 14, where the first network of first phase shifters includes: a first driver coupled to each of the first phase shifters, the first driver configured to configure the first phase shifters to provide a first phase offset.

Example 16. The optical beam steering device of one of examples 12 to 15, where the second network of second phase shifters includes: a second driver coupled to each of the second phase shifters, the second driver being configured to configure the second phase shifters to provide a second phase offset different from the first phase offset.

Example 17. The optical beam steering device of one of examples 12 to 16, where a first one of the plurality of OPAs include: an antenna including N linear waveguides corresponding to the N outputs of the first one of the plurality of OPAs; and N fixed phase shifters coupled to the beam splitter network, each of the N fixed phase shifters having a different optical path length than another one of the N fixed phase shifters, and each of the N linear waveguides being coupled to an output of one of the N fixed phase shifters.

Example 18. The optical beam steering device of one of examples 12 to 17, where each of the N fixed phase shifters include curved waveguides, where a curvature of the each of the N fixed phase shifters is different from another one of the N fixed phase shifters.

Example 19. The optical beam steering device of one of examples 12 to 18, where the central beam axis of the plurality of OPAs is disposed around the main axis, where the optical path length of each of the N fixed phase shifters increases away from the main axis of the optical beam steering device.

Example 20. The optical beam steering device of one of examples 12 to 19, where the central beam axis of a second one of the plurality of OPAs is oriented along the main axis.

Example 21. A method for beam steering, the method including: coupling a laser source to a first optical phased array (OPA), the first OPA including a beam splitter network having an output including a plurality of N outputs around a first central beam axis, a first network of first phase shifters, and a second network of second phase shifters; generating an output optical beam around the first central beam axis at the output of the beam splitter network by steering the output optical beam in a first direction away from the first central beam axis with a first network of first phase shifters; and steering the output optical beam in a second direction away from the first central beam axis with a second network of second phase shifters, the second direction being opposite to the first direction.

Example 22. The method of example 21, where the beam splitter network includes a plurality of stages of optical beam splitters, each optical beam splitter having an input, a first output waveguide, and a second output waveguide, each first output waveguide of the optical beam splitter being associated with one of the first phase shifters and each second output waveguide of the optical beam splitter being associated with one of the second phase shifters, and where generating the output optical beam includes: applying a first potential to the first phase shifters with a first driver to add a first phase offset to an optical beam passing through the first output waveguide; and applying a second potential to the second phase shifters with a second driver to add a second phase offset to an optical beam passing through the second output waveguide.

Example 23. The method of one of examples 21 or 22, further including coupling a plurality of outputs of a switching matrix between the laser source and a plurality of optical phased arrays (OPAs) including the first OPA, the plurality of OPAs being arranged to have an optical output direction around a main axis, each of the plurality of OPAs including an output optical beam direction oriented around a central beam axis, the central beam axis of each of the plurality of OPAs being different from one another.

Example 24. The method of one of examples 21 to 23, further including: sequentially switching between the plurality of OPAs to steer the beam direction of the output from the plurality of OPAs.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical beam steering device comprising:
  a laser source coupled to an optical phased array (OPA), the OPA comprising:
    a beam splitter network optically coupled to the laser source and configured to split a laser beam generated by the laser source into N outputs to generate an output optical beam;
    a first network of first phase shifters configured to steer the output optical beam in a first direction away from a longitude direction; and
    a second network of second phase shifters configured to steer the output optical beam in a second direction away from the longitude direction, the second direction being opposite to the first direction.

2. The optical beam steering device of claim 1, wherein the beam splitter network comprises a plurality of stages of optical beam splitters, each optical beam splitter having an input, a first output waveguide, and a second output waveguide, each first output waveguide of the optical beam splitter being associated with one of the first phase shifters and each second output waveguide of the optical beam splitter being associated with one of the second phase shifters, the first phase shifters being configured to add a first phase offset to an optical beam passing through the first output waveguide, the second phase shifters being configured to add a second phase offset to an optical beam passing through the second output waveguide.

3. The optical beam steering device of claim 2, wherein the first output waveguide and the second output waveguide of a final stage of each of the plurality of stages of optical beam splitters are each connected to an array of linear gratings.

4. The optical beam steering device of claim 2, wherein an $i^{th}$ stage of the plurality of stages of optical beam splitters comprises:
   $2^{i-1}$ 1×2 optical splitters, and wherein i is an integer greater than or equal to 1.

5. The optical beam steering device of claim 1, wherein the first network of first phase shifters comprises:
   a first driver coupled to each of the first phase shifters, the first driver configured to configure the first phase shifters to provide a first phase offset.

6. The optical beam steering device of claim 5, wherein the second network of second phase shifters comprises:
   a second driver coupled to each of the second phase shifters, the second driver being configured to configure the second phase shifters to provide a second phase offset different from the first phase offset.

7. The optical beam steering device of claim 6, wherein the first phase shifters and the second phase shifters are identical.

8. The optical beam steering device of claim 6, wherein first phase offset is opposite to the second phase offset.

9. The optical beam steering device of claim 1, wherein the first network of first phase shifters and the second network of second phase shifters comprise thermal or electro-optical phase shifters.

10. The optical beam steering device of claim 1, further comprising:
    an antenna comprising N linear waveguides, the N linear waveguides corresponding to the N outputs; and
    N fixed phase shifters coupled to the beam splitter network, each of the N fixed phase shifters having a different optical path length than another one of the N fixed phase shifters, and each of the N linear waveguides being coupled to an output of one of the N fixed phase shifters.

11. The optical beam steering device of claim 10, further comprising a switching matrix coupled between the laser source and the OPA.

12. An optical beam steering device comprising:
    a switching matrix comprising a plurality of z outputs coupled to a plurality of optical phased arrays (OPAs) and configured to guide a laser beam emitted by a laser source sequentially to the plurality of OPAs, the laser being emitted around a main axis, each of the plurality of OPAs comprising an output optical beam direction oriented around a central beam axis, the central beam axis of each of the plurality of OPAs being different from one another, each of the plurality of OPAs comprising:
      a beam splitter network coupled to the laser source configured to split the laser beam into N outputs to generate a corresponding output optical beam,
      a first network of first phase shifters configured to steer the output optical beam in a first direction away from the central beam axis, and
      a second network of second phase shifters configured to steer the output optical beam in a second direction away from the central beam axis, the second direction being opposite to the first direction.

13. The optical beam steering device of claim 12, wherein the beam splitter network comprises a plurality of stages of optical beam splitters, each optical beam splitter having an input, a first output waveguide, and a second output waveguide, each first output waveguide of the optical beam splitter being associated with one of the first phase shifters and each second output waveguide of the optical beam splitter being associated with one of the second phase shifters, the first phase shifters being configured to add a first phase offset to an optical beam passing through the first output waveguide, the second phase shifters being configured to add a second phase offset to an optical beam passing through the second output waveguide.

14. The optical beam steering device of claim 13, wherein an $i^{th}$ stage of the plurality of stages of optical beam splitters comprises $2^{i-1}$ 1×2 optical splitters.

15. The optical beam steering device of claim 12, wherein the first network of first phase shifters comprises:
    a first driver coupled to each of the first phase shifters, the first driver configured to configure the first phase shifters to provide a first phase offset.

16. The optical beam steering device of claim 12, wherein the second network of second phase shifters comprises:
    a second driver coupled to each of the second phase shifters, the second driver being configured to configure the second phase shifters to provide a second phase offset different from the first phase offset.

17. The optical beam steering device of claim 12, wherein a first one of the plurality of OPAs comprise:
    an antenna comprising N linear waveguides corresponding to the N outputs of the first one of the plurality of OPAs; and
    N fixed phase shifters coupled to the beam splitter network, each of the N fixed phase shifters having a different optical path length than another one of the N fixed phase shifters, and each of the N linear waveguides being coupled to an output of one of the N fixed phase shifters.

18. The optical beam steering device of claim 17, wherein each of the N fixed phase shifters comprise curved waveguides, wherein a curvature of the each of the N fixed phase shifters is different from another one of the N fixed phase shifters.

19. The optical beam steering device of claim 17, wherein the central beam axis of the plurality of OPAs is disposed around the main axis, wherein the optical path length of each of the N fixed phase shifters increases away from the main axis of the optical beam steering device.

20. The optical beam steering device of claim 17, wherein the central beam axis of a second one of the plurality of OPAs is oriented along the main axis.

21. A method for beam steering, the method comprising:
    coupling a laser source to a first optical phased array (OPA), the first OPA comprising a beam splitter network having an output comprising a plurality of N outputs around a first central beam axis, a first network of first phase shifters, and a second network of second phase shifters;
    generating an output optical beam around the first central beam axis at the output of the beam splitter network by steering the output optical beam in a first direction away from the first central beam axis with a first network of first phase shifters; and
    steering the output optical beam in a second direction away from the first central beam axis with a second network of second phase shifters, the second direction being opposite to the first direction.

22. The method of claim 21, wherein the beam splitter network comprises a plurality of stages of optical beam splitters, each optical beam splitter having an input, a first output waveguide, and a second output waveguide, each first output waveguide of the optical beam splitter being associated with one of the first phase shifters and each second output waveguide of the optical beam splitter being associated with one of the second phase shifters, and wherein generating the output optical beam comprises:

applying a first potential to the first phase shifters with a first driver to add a first phase offset to an optical beam passing through the first output waveguide; and applying a second potential to the second phase shifters with a second driver to add a second phase offset to an optical beam passing through the second output waveguide.

23. The method of claim 21, further comprising:

coupling a plurality of outputs of a switching matrix between the laser source and a plurality of optical phased arrays (OPAs) comprising the first OPA, the plurality of OPAs being arranged to have an optical output direction around a main axis, each of the plurality of OPAs comprising an output optical beam direction oriented around a central beam axis, the central beam axis of each of the plurality of OPAs being different from one another.

24. The method of claim 23, further comprising:

sequentially switching between the plurality of OPAs to steer the beam direction of the output from the plurality of OPAs.

* * * * *